United States Patent [19]

Inglis

[11] Patent Number: 4,462,269
[45] Date of Patent: Jul. 31, 1984

[54] FLYWHEEL
[75] Inventor: James J. Inglis, Livonia, Mich.
[73] Assignee: Davis Tool & Engineering Company, Inc., Detroit, Mich.
[21] Appl. No.: 550,715
[22] Filed: Nov. 10, 1983

Related U.S. Application Data

[63] Continuation of Ser. No. 327,566, Dec. 4, 1981, abandoned, which is a continuation of Ser. No. 83,983, Oct. 11, 1979, abandoned.

[51] Int. Cl.³ .............................................. F16C 15/00
[52] U.S. Cl. ........................................ 74/572; 74/448; 123/185 R
[58] Field of Search ................. 74/572, 439, 446, 448, 74/449; 123/185 R, 179 R

[56] References Cited

U.S. PATENT DOCUMENTS

| | | |
|---|---|---|
| 143,009 | 9/1873 | Gerner . |
| 209,475 | 10/1878 | Harris . |
| 304,809 | 9/1884 | Esplin . |
| 420,842 | 2/1890 | Vauclain . |
| 430,270 | 6/1890 | Cook . |
| 786,274 | 4/1905 | Duff . |
| 817,462 | 4/1906 | Backus . |
| 882,037 | 3/1908 | Wethebill, Jr. et al. . |
| 923,467 | 6/1909 | Wagner . |
| 1,071,946 | 9/1913 | Morse . |
| 1,159,052 | 11/1915 | LeBlanc . |
| 1,160,000 | 11/1915 | Schmitt . |
| 1,180,495 | 4/1916 | Headson . |
| 1,251,979 | 1/1918 | Lewis ................................ 74/449 |
| 1,264,642 | 4/1918 | Harley . |
| 1,265,899 | 5/1918 | Forster . |
| 1,422,633 | 7/1922 | Sterrett . |
| 1,451,818 | 4/1923 | Forster . |
| 1,512,560 | 10/1924 | Moore . |
| 1,619,884 | 3/1927 | Reed . |
| 1,641,967 | 9/1927 | Fulper . |
| 1,645,268 | 10/1927 | Walker ................................ 74/572 |
| 1,645,323 | 10/1927 | Griswold . |
| 1,701,519 | 2/1929 | Walker . |
| 1,706,678 | 3/1929 | Pangburn . |
| 1,729,026 | 9/1929 | Bradley . |
| 1,753,365 | 4/1930 | Daukus . |
| 1,800,883 | 4/1931 | Booth . |
| 1,852,957 | 4/1932 | Dalton et al. . |
| 1,874,712 | 8/1932 | Sponable . |
| 1,913,803 | 6/1933 | Griswold . |
| 1,976,546 | 10/1934 | Doerr . |
| 2,216,308 | 10/1940 | Ballman . |
| 2,265,076 | 12/1941 | Larsen . |
| 2,269,966 | 1/1942 | Wemp . |
| 2,474,370 | 6/1949 | Russell . |
| 2,488,877 | 11/1949 | Peterson . |
| 2,516,365 | 7/1950 | Carraher . |
| 2,525,946 | 10/1950 | Roberts . |
| 2,669,130 | 2/1954 | Shell . |
| 2,719,438 | 10/1955 | Schlefer ................................ 74/572 |
| 2,835,141 | 5/1958 | De Lorean . |
| 2,982,150 | 5/1961 | Kolbe . |
| 3,008,312 | 11/1961 | Jacobus ................................ 74/448 |
| 3,023,636 | 3/1962 | Kelley et al. ...................... 74/572 |
| 3,080,771 | 3/1963 | Baldwin . |
| 3,234,817 | 2/1966 | Williamson . |
| 3,299,735 | 1/1967 | Stott . |
| 3,578,822 | 5/1971 | Slemmons . |
| 3,602,058 | 8/1971 | Beddoe . |
| 3,719,103 | 3/1973 | Streander ............................ 74/445 |
| 3,730,013 | 5/1973 | Slemmons . |
| 4,044,627 | 8/1977 | Zander . |
| 4,174,643 | 11/1979 | Tsukamoto . |
| 4,220,233 | 9/1980 | Ban et al. . |
| 4,241,619 | 12/1980 | Cerny et al. ........................ 74/448 |

FOREIGN PATENT DOCUMENTS 458602 8/1949 Canada .
513713 12/1930 Fed. Rep. of Germany .
736808 9/1955 United Kingdom .

Primary Examiner—Kenneth Dorner
Attorney, Agent, or Firm—Harness, Dickey & Pierce

[57] ABSTRACT

This disclosure relates to a flywheel for use with an automotive engine or the like. The flywheel of the present invention is basically a one-piece structure comprised of a disc portion and an integrally formed ring portion having gear teeth on its outer circumference. These gear teeth engage the pinion gear on the engine's starting motor and have appropriately positioned reinforcement thereon. This new construction does away with the need for attaching a ring gear to a separate stamped metal disc to form the flywheel, and also offers several manufacturing, performance, weight, and cost advantages.

13 Claims, 10 Drawing Figures

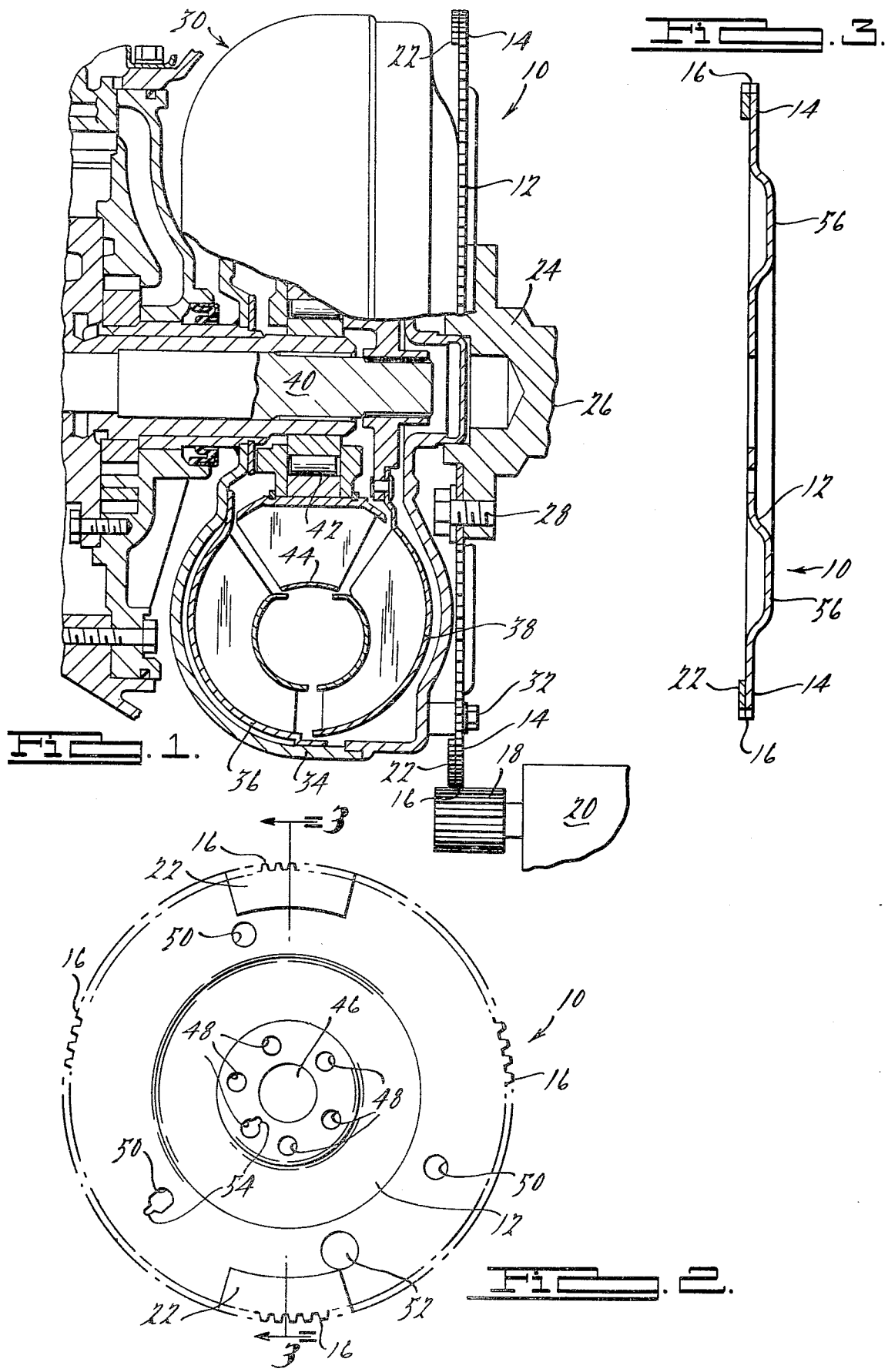

FLYWHEEL

This application is a continuation of application Ser. No. 327,566, filed Dec. 4, 1981, now abandoned, which in turn is a continuation of application Ser. No. 083,983, filed Oct. 11, 1979, now abandoned.

BACKGROUND AND SUMMARY OF THE INVENTION

The present invention pertains primarily to flywheels, and more particularly to flywheels for use with an automotive engine or the like.

Generally, the starting mechanism for an internal combustion engine such as an automotive engine comprises an electric starting motor which is engaged via a pinion gear to mating teeth on a flywheel, which in turn is attached to the crankshaft of the engine. When the electric starting motor receives electric current from an electric storage battery, the teeth of the pinion gear on the end of the motor armature shaft are automatically brought into engagement with the teeth of the flywheel, thereby causing the crankshaft to rotate. Once the engine has started, that is, once the engine commences operation via the typical internal combustion cycle, the pinion gear of the starting motor is automatically disengaged, and the flywheel continues to rotate due to the movement of the crankshaft.

There are two different types of flywheels used with automotive engines or the like. The first type is used with a manual transmission and usually comprises a massive cast metal assembly, which in addition to providing mounting means for the bell housing and clutch of the transmission, more importantly provides inertia in the classic flywheel sense to keep the engine from stalling out. This type of casting usually has a ring gear shrunk or sweated on to its outer circumference. The teeth on the ring gear engage the teeth on the starting motor pinion gear. The second type of flywheel is used with an automatic transmission and usually comprises a relatively thin metal stamping, called a flexplate, having a ring gear attached, usually by welding, to the outer circumference thereof. Although this type of flywheel is not really used to provide any inertia for the engine, a torque converter is usually mounted thereon as part of the transmission. The present invention relates primarily to this second type of flywheel, although it is contemplated that the basic idea of this invention might also be applied to the first type of flywheel described above with appropriate modifications. The term "flywheel" is used herein as including said second type.

A typical flywheel for use with an automatic transmission would in part be comprised of a stamping made from material such as S.A.E. 1010 hot rolled aluminum killed steel having a Rockwell "B" hardness of between about 55 and 75. The stamping could be made in either a progressive or transfer die system, washed, and then shot peened to provide additional strength. The resulting stamping would be disc-shaped and have holes appropriately placed therein for mounting and aligning the crankshaft of the engine, the torque converter, and the transmission. A small disc-shaped wear plate may have to be welded on to the hub area of the flexplate where the flexplate is mounted on the crankshaft. The outer edges of the flywheel would be bent 90° to provide an attaching surface or flange for the ring gear which is welded thereto.

The ring gear is typically made from such material as S.A.E. 1040/1050 fine grain steel. It is usually manufactured by cutting a strip from a long bar; wrapping it in a circle; buttwelding the ends together; reforming, rounding, and flattening the piece; machining the inner diameter; machining and chamfering the top face; machining and chamfering the lower face; cutting the gear teeth on the outer diameter; and then heat treating the piece. The ring gear is then usually welded to the stamped disc or flexplate described above. Weld slag is removed from the resulting flywheel assembly and then it is balanced.

Although the typical two-piece flywheel described above for use with automatic transmissions is widely used, it does possess several disadvantages. For example, it should be readily apparent from the above description that the flywheel assembly is rather complicated to manufacture, that is, both of the parts in the two-piece assembly require several manufacturing steps. Inherent in the design and construction of this two-piece flywheel are such problems as: (1) lack of concentricity and teeth run-out, in which the ring gear is not perfectly matched to the circumference of the inner flexplate and in which the gear teeth therefore vary in radial distance from the crankshaft; and (2) face wobble, in which the respective planes of the flexplate and ring gear are different rather than the same.

Accordingly, it is a principle object of the present invention to provide a flywheel for use with an automotive engine or the like which may be fabricated in one piece and then selectively reinforced where necessary, thereby eliminating the need for attaching a separate ring gear to a flexplate or stamped metal disc.

In general, the flywheel according to the present invention is a one-piece construction which comprises a generally flat, disc portion having a hub and aperture in the center thereof for mounting and alignment on the crankshaft of the automotive engine or the like, and a ring portion integrally formed with and positioned around the outer circumference of said disc portion. The ring portion has radially-outwardly extending teeth thereon adapted to engage mating teeth on the engine's starting motor pinion gear. A separate and distinct reinforcement segment or member is applied in overlapping relationship on the teeth of the ring portion to provide additional strength to the teeth at the points where the starting motor pinion gear is initially engaged.

With regard to a typical automotive four-cylinder engine, and by way of illustration of the present invention, it has been found that only two discrete reinforcement segments are necessary on the teeth of the ring portion. This is because a typical automotive four-cylinder engine always stops at one of two possible locations in a 360° rotation due to the relative locations of the pistons in the engine and the balancing of compression forces when the engine is turned off. (The only known exception to this is what is known as a "false start", in which an attempt is made to "start" the engine when it is already running, thereby causing the starting motor pinion gear to strike a rotating flywheel rather than one that is normally stationary before engagement.) Normally, therefore, the reinforcement segments are only necessary at two points on the flywheel, these two points being the only two locations where the pinion gear of the starting motor engages the teeth on the ring portion of the stationary flywheel. These two locations must bear the brunt of the forces exerted by the pinion gear against the flywheel. Since a six-cylinder engine stops in three different locations and an eight-cylinder engine stops in four different locations, it is contemplated that the present invention is equally applicable in those situations by using three and four reinforcement segments respectively.

Additional advantages and features of the present invention will become apparent from a reading of the detailed description of the preferred embodiment which makes reference to the following set of drawings in which:

BRIEF DESCRIPTION OF THE DRAWINGS

FIG. 1 is an elevation view, partially in section, of a portion of an internal combustion engine and transmission showing the flywheel of the present invention;

FIG. 2 is a plan view of the flywheel of the present invention;

FIG. 3 is a sectional view along line 3—3 of FIG. 2;

DETAILED DESCRIPTION OF THE PREFERRED EMBODIMENT

Figure 4:
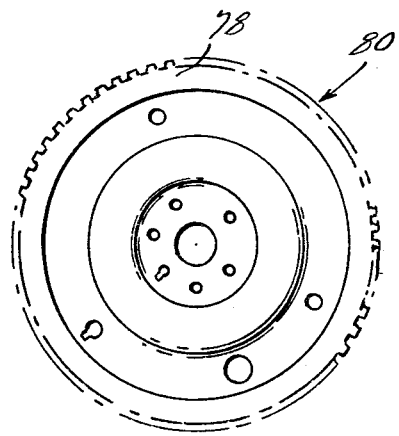
FIG. 4 is a plan view of a flywheel made in accordance with the present invention having a continuous reinforcement segment thereon.

Referring to FIG. 1, a portion of an internal combustion engine and a transmission incorporating the flywheel of the present invention is shown. The flywheel 10 illustrated in this preferred embodiment is constructed for use with a four-cylinder internal combustion engine having an automatic transmission. However, it is to be understood that the present invention is applicable to other engine configurations. The flywheel 10 generally comprises a disc portion 12, which is a round relatively flat, stamped metal plate, and a ring portion 14 which is integrally formed with disc portion 12, and forms the outer edge or circumference of the flywheel. (The construction of the flywheel will be dealt with further hereinafter in the discussion of FIGS. 2 and 3.) The ring portion 14 of the flywheel has gear teeth 16 along its entire circumference which engage mating teeth on a pinion gear 18 which is located on the armature or drive shaft of starting motor 20. It should be noted that the ring portion 14 of the flywheel contains a reinforcement segment 22 at the point where it engages the pinion gear 18 of the starting motor when the engine is at rest. As explained earlier, the pinion gear of the starting motor is normally only in contact with the flywheel when the engine is being started, and is automatically withdrawn from contact once the engine is started.

The flywheel 10 is fastened to a mounting hub 24 formed on the end of the engine crankshaft 26 via mounting bolts 28. A torque converter assembly 30 which is part of the automatic transmission on the subject internal combustion engine is mounted on the other side of the flywheel 10 via mounting bolts 32. The torque converter assembly 30 comprises an outer housing 34 which is the portion of the torque converter which is directly fastened to the flywheel. Rotation of the engine crankshaft 26 causes the flywheel 10 to rotate which thus causes the torque converter housing 34 to rotate, all in unison since directly connected. The torque converter housing and inner blade member 36 fastened thereto function like a turbine pump to transfer the rotational movement of the crankshaft, flywheel and housing to a second inner blade 38 of the torque converter 30 via fluid contained within the torque converter. The resulting movement of the second inner blade 38 causes the turbine shaft 40 of the transmission to rotate. The torque converter assembly also contains a converter clutch 42 which is fastened to what is typically known as the stator 44 of the torque converter. This portion of the torque converter is normally stationary except under certain circumstances when it functions as a one-way clutch to protect the torque converter from reverse movement or the like.

Referring now to FIG. 2, a plan view of the flywheel 10 according to the present invention is shown. As briefly described above, the flywheel 10 includes a disc portion 12 and an integrally-formed ring portion 14. The center of the flywheel has an aperture 46 therethrough for mounting and aligning the engine crankshaft 26. The aperture 46 is surrounded by six holes 48 for the mounting bolts 28 referred to in FIG. 1. The outer area of the disc portion 12 contains three holes 50 which are used for mounting the torque converter housing 34 via mounting bolts 32. This outer area of the disc portion 12 also contains an access hole 52 for the automatic transmission. It should be noted that one of the holes 48 and one of the holes 50 contain a blimp or notch 54 which aids in positioning the flywheel relative to the stopping points of the automotive engine.

The outermost or ring portion of the flywheel 10 is comprised of gear teeth 16 around its entire circumference. The teeth are of a pitch and depth so as to mate with the pinion gear of the electric starting motor on the engine. The number of teeth will vary with the type of engine, size of the flywheel, and type of starting motor pinion gear. Two reinforcement segments 22 are shown on the ring portion of the flywheel. These segments are attached during manufacture of the flywheel and overlap a series of gear teeth on the flywheel circumference to provide additional strength on those two areas.

Referring now to FIG. 3, a sectional view of the flywheel 10 according to the present invention is shown. This figure shows a circular indentation band 56 which is made in the disc portion 12 of the flywheel. This indentation band in part allows the metal disc to flex to a limited extent to help absorb and transmit the forces exerted upon it during engagement with the starting motor pinion gear.

Figure 5:
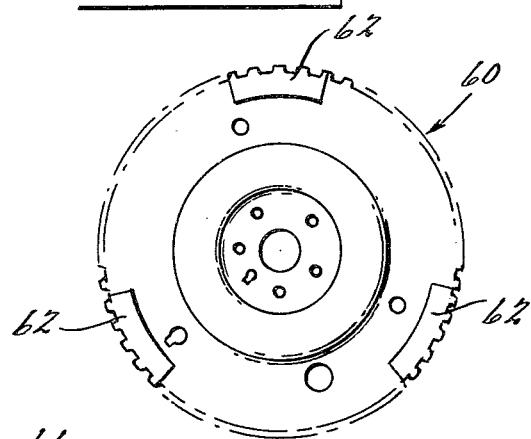
FIG. 5 is a plan view of a flywheel made in accordance with the present invention having three reinforcement segments thereon.
Figure 6:
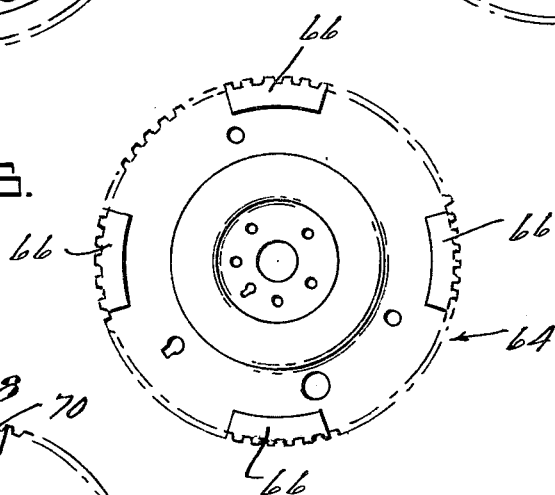
FIG. 6 is a plan view of a flywheel made in accordance with the present invention having four reinforcement segments thereon.

FIG. 5 shows a flywheel 60 made in accordance with the present invention having three reinforcement segments 62 thereon. FIG. 6 shows a flywheel 64 made in accordance with the present invention having four reinforcement segments 66 thereon.

The manufacturing process of the flywheel of the present invention is considerably less involved than the manufacturing process heretofore described for the two piece flywheel, that is, one comprised of a flexplate and a separate ring gear welded thereto. It is contemplated that either a progressive or transfer die may be used to make the flywheel of the present invention. The advantages and disadvantages of each die system will be described later.

In the preferred but illustrative practice of the present invention, the first step in making the flywheel is to stamp a round plate out of such material as S.A.E. 1050 annealed steel coil. The small reinforcement segments which are attached to the flywheel are made from the same material as the round plates by stamping them out of the offal or material remaining from the steel strip after the round pieces are stamped out. These reinforcement segments are made at the rate of two segments per flywheel at the same time the round plates are being stamped out. Then, all pieces are washed. Next, the reinforcement segments are welded on to the round plates via wire welding with a shielded arc or the like, with the welding taking place around the radially inner arc of the reinforcement segment and side edges, or taking place through an arcuate weld slot made in the center of the segment. After any weld slag or scale is removed, the gear teeth are pot broached on to the round plate and reinforcement assembly. The flywheel is then balanced, with holes punched in the flywheel where necessary. As a final step in making the flywheel of the present invention, the gear teeth are heat treated via induction hardening and quenching to give a Rockwell "C" hardness of about 45 to 55 at the pitch diameter of the teeth.

By way of illustrative example, the following are typical of some of the specifications for an experimental flywheel according to the present invention which may be used with a currently produced automotive four-cylinder engine:

1. Material:
    S.A.E. 1050 steel-annealed (about 0.125 inches thick),
2. Total Diameter:
    About 11.285 to 11.300 inches,
3. Crankshaft Mounting Holes:
    Total of 6—equally spaced around the flywheel at a radius of about 1.375 inches, except one hole which is offset about 0.1 inches and contains an identification notch,
4. Torque Converter Mounting Holes:
    Total of 3—equally spaced around the flywheel at a radius of about 4.87 inches, except one hole which is offset, contains an identification notch, and is radially aligned with the offset crankshaft mounting hole described above,
5. Center Aperture:
    About 1.2603 inches in diameter,
6. Indentation Band:
    About 2.24 inches wide starting at about 1.90 inches from flywheel axis,
7. Gear Teeth
    Number of Teeth: 135,
    Diameter Pitch: About 12,
    Pressure Angle: About 12°,
    Minor Diameter: About 10.971 to 1.951 inches (Full Fillet Root),
    Theoretical Pitch Diameter: About 11.250 inches,
    Whole Tooth Depth: About 0.165 inches,
    Base Circle Diameter: About 11.004 inches,
    Teeth Hardness: About 45 to 55-Rockwell "C" measured at the midpoint of gear tooth profile,
8. Number of Reinforcement Segments:
    2 locations,
9. Location of Reinforcement Segments:
    About 42° from the offset holes (off top dead center),
10. Length of Reinforcement Segments:
    About 3 inches along an arc scribed at a radius of about 10.393 inches It should be appreciated that the above specifications are experimental and will vary with different types of engines, and may also change from time to time depending on performance requirements.

As mentioned above, the flywheel of the present invention can be manufactured by any number of methods including progressive or transfer die systems. Both a progressive die and a transfer die are labor saving machines and consist basically of one or more work stations through which the workpiece is successively advanced to completion. The basic difference is that a transfer die employs mechanical fingers to shuttle the workpiece through these various work stations, whereas a progressive die uses a carrier ribbon of the very material the stamping is created from to move it through. A progressive die therefore has to use a coil width generally greater than is actually necessary to make the stamping, thus making the finished parts slightly more expensive, although processing costs are usually less expensive. A transfer die, on the other hand, may result in lower material costs and thus less expensive parts due to less offal or scrap, but the tools for transfer dies are generally slightly more expensive. In the case of the present invention, a transfer die system appears to be preferable since less offal or scrap is produced.

The flywheel of the present invention offers several distinct advantages over the typical two-piece flywheel comprised of a ring gear welded to a flexplate. First, since a separate ring gear and flexplate are no longer necessary, material and manufacturing costs are greatly reduced, since the body and teeth are integrally formed in a single piece. Second, and in connection with the first advantage, the flywheel of the present invention also weighs significantly less than its two-piece counterpart, which to automotive engineers is an extremely attractive advantage. Third, due to the streamlined manufacturing process as compared to the two-piece flywheel, a more reliable part is produced since it has been found that the usual problems of teeth run-out, concentricity, and face wobble virtually no longer exist in the flywheel of the present invention. Fourth, since the gear teeth are integral with the "flexplate", there is no chance of ring gear separation, as is common with a two-piece flywheel. Fifth, since any portion of the present one-piece flywheel is made of the same basic steel, selective hardening is possible, thereby eliminating the need for specially applied wear plates at the crankshaft mount, or a separate steel ring of significantly harder steel than the inner disc portion or flexplate. And sixth, since induction heat treating may be effectively used with the present flywheel, rather than flame hardening, a better heat effective zone results. All in all, a much better flywheel is produced in terms of cost, weight, design, performance, and reliability.

Figure 7:
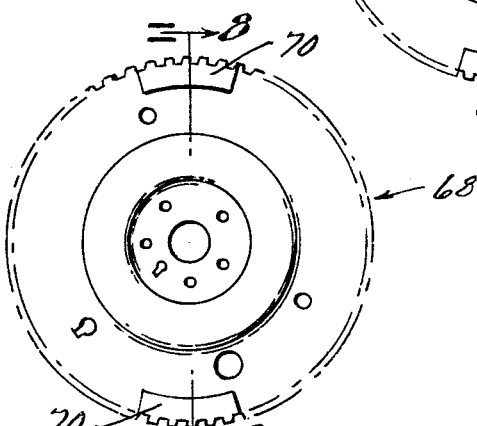
FIG. 7 is a plan view of a flywheel made in accordance with the present invention wherein reinforcement segments are applied on opposite sides of the flywheel.
Figure 9:
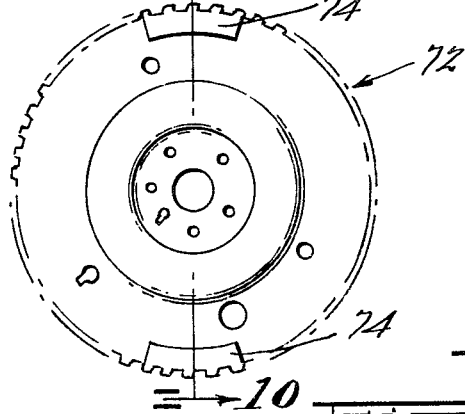
FIG. 9 is a plan view of a flywheel made in accordance with the present invention wherein reinforcement segments are applied in overlapping relationship with other reinforcement segments on the flywheel.
Figure 8:
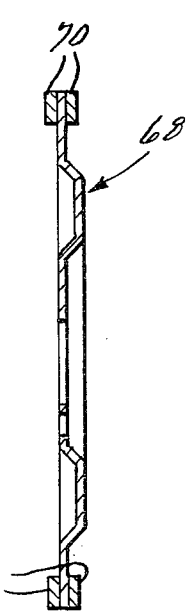
FIG. 8 is a sectional view along the line 8—8 of FIG. 7.
Figure 10:
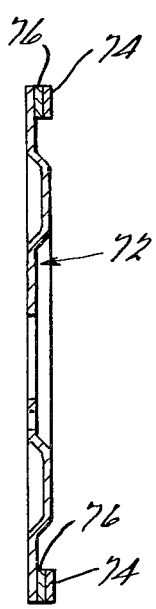
FIG. 10 is a sectional view along the line 10—10 of FIG. 9.

Although not referred to in connection with the preferred embodiment described above, it is also contemplated that the ring portion of the flywheel of the present invention may be reinforced on both sides of the original stamping at the same time, as well as on either of the two sides of the flywheel. FIGS. 7 and 8 show a flywheel 68 made in accordance with the present invention wherein reinforcement segments 70 are applied on opposite sides of the flywheel 68. Also, it is believed that multiple layers of reinforcement segments might be possible in some applications. FIGS. 9 and 10 show a flywheel 72 made in accordance with the present invention wherein reinforcement segments 74 are applied in overlapping relationship with other reinforcement segments 76 on the flywheel 72. And as a further extension of the basic concept of this invention, a single continuous reinforcement ring 78, as shown on the flywheel 80 in FIG. 4, might be used for engines having many cylinders or if "false starts" provide sufficient reason to use the same. A sectional view of the flywheel 80 of FIG. 4 would be similar to FIG. 3.

While the above description constitutes the preferred embodiment of the present invention, it will be appreciated that the invention is susceptible to modifications, variation and change without departing from the proper scope or fair meaning of the accompanying claims.

What is claimed is:

1. A flywheel for use on an automotive engine or the like comprising:
    (a) a generally flat disc having an aperture in the center thereof for mounting on a crankshaft of an engine;
    (b) a ring portion, integrally formed with and positioned around the outer circumference of said disc, said disc and integrally formed ring portion being a one piece construction of substantially the same thickness, said ring portion having radially outwardly extending teeth of the same shape thereon adapted to engage a starting motor pinion gear on the engine; and
    (c) at least one separate and distinct reinforcement member, being generally in the shape of a portion of an annulus, extending over only a radially outer portion of said flywheel and applied in overlapping and circumferentially aligned relationship with teeth on said ring portion to provide additional strength to said teeth on said ring portion, said reinforcement member also having radially outwardly extending teeth of the same shape thereon, said overlapping teeth on said reinforcement member being of the same shape as said teeth on said ring portion.

2. The invention of claim 1 wherein a plurality of reinforcement members each being generally in the shape of a portion of an annulus and extending over only radially outer portions of said flywheel are applied in overlapping relationship with teeth on said ring portion.

3. The invention of claim 2 wherein two reinforcement members are applied in overlapping relationship with teeth on said ring portion.

4. The invention of claim 3 wherein said two reinforcement members are positioned diametrically opposite one another on said ring portion of said flywheel.

5. The invention of claim 2 wherein three reinforcement members are applied in overlapping relationship with teeth on said ring portion.

6. The invention of claim 2 wherein four reinforcement members are applied in overlapping relationship with teeth on said ring portion.

7. The invention of claim 2 wherein said reinforcement members are applied on opposite sides of said ring portion.

8. The invention of claim 2 wherein at least one reinforcement member is applied in overlapping relationship with another reinforcement member which is in turn applied to said ring portion of said flywheel.

9. A flywheel for use on a four-cylinder automotive engine or the like comprising:
    (a) a generally flat disc having an aperture in the center thereof for mounting on a crankshaft of an engine;
    (b) a ring portion, integrally formed with and positioned around the outer circumference of said disc, said disc and integrally formed ring portion being a one piece construction of substantially the same thickness, said ring portion having radially-outwardly extending teeth of the same shape thereon adapted to engage a starting motor pinion gear on the engine; and
    (c) two separate and distinct reinforcement members, each being generally in the shape of a portion of an annulus, and positioned diametrically opposite one another on one side of said ring portion of said flywheel, each of said members extending over only a radially outer portion of said flywheel and being applied in overlapping and circumferentially aligned relationship with a plurality of teeth on said ring portion at two diametrically opposite positions on the circumference of the flywheel where the starting motor pinion gear initially engages said flywheel, said reinforcement members providing additional strength to said teeth on said ring portion, each of said reinforcement members also having radially outwardly extending teeth of the same shape thereon, said overlapping teeth on each of said reinforcement members being of the same shape as said teeth on said ring portion.

10. A flywheel for use on an automotive engine or the like comprising:
    (a) a generally flat disc having an aperture in the center thereof for mounting on a crankshaft of an engine;
    (b) a ring portion, integrally formed with and positioned around the outer circumference of said disc, said disc and integrally formed ring portion being a one piece construction of substantially the same thickness, said ring portion having radially outwardly extending teeth of the same shape thereon adapted to engage a starting motor pinion gear on the engine; and
    (c) a separate and distinct continuous reinforcement member of generally annular shape overlapping all the teeth on said ring portion, extending over only a radially outer portion of said flywheel and applied in overlapping and circumferentially aligned relationship with teeth on said ring portion to provide additional strength to said teeth on said ring portion, said reinforcement member also having radially outwardly extending teeth of the same shape thereon, said overlapping teeth on said reinforcement member being of the same shape as said teeth on said ring portion.

11. In an automotive engine or the like having four cylinders and having associated therewith a crankshaft which upon deenergization of the engine comes to rest at one of two predetermined locations, a starting motor associated with the engine, and a pinion gear on the starting motor, the improvement comprising:

a flywheel comprising a generally flat disc having an aperture in the center thereof for mounting on the crankshaft of the engine;

said disc including a ring portion, integrally formed with and positioned around the outer circumference of said disc, said disc and integrally formed ring portion being a one piece construction of substantially the same thickness, said ring portion having radially outwardly extending teeth of the same shape thereon adapted to engage the starting motor pinion gear on the engine;

said flywheel also comprising two separate and distinct reinforcement members, each being generally in the shape of a portion of an annulus and extending over only radially outer portions of said flywheel and having radially outwardly extending teeth of the same shape thereon in overlapping and circumferentially aligned relationship with teeth on said ring portion to provide additional strength to said teeth on said ring portion, said overlapping teeth on said reinforcement members being of the same shape as said teeth on said ring portion;

one of said reinforcement members being positioned on said flywheel at each of said two predetermined locations where the deenergized engine comes to rest; and means for mounting said flywheel on the crankshaft of the engine so that the pinion gear will initially engage said flywheel at one of said two predetermined locations where said reinforcement members are positioned.

12. In an automotive engine or the like having six cylinders and having associated therewith a crankshaft which upon deenergization of the engine comes to rest at one of three predetermined locations, a starting motor associated with the engine, and a pinion gear on the starting motor, the improvement comprising:

a flywheel comprising a generally flat disc having an aperture in the center thereof for mounting on the crankshaft of the engine;

said disc including a ring portion, integrally formed with and positioned around the outer circumference of said disc, said disc and integrally formed ring portion being a one piece construction of substantially the same thickness, said ring portion having radially outwardly extending teeth of the same shape thereon adapted to engage the starting motor pinion gear on the engine;

said flywheel also comprising three separate and distinct reinforcement members, each being generally in the shape of a portion of an annulus and extending over only radially outer portions of said flywheel and having radially outwardly extending teeth of the same shape thereon in overlapping and circumferentially aligned relationship with teeth on said ring portion to provide additional strength to said teeth on said ring portion, said overlapping teeth on said reinforcement members being of the same shape as said teeth on said ring portion;

one of said reinforcement members being positioned on said flywheel at each of said three predetermined locations where the deenergized engine comes to rest; and means for mounting said flywheel on the crankshaft of the engine so that the pinion gear will initially engage said flywheel at one of said three predetermined locations where said reinforcement members are positioned.

13. In an automotive engine or the like having eight cylinders and having associated therewith a crankshaft which upon deenergization of the engine comes to rest at one of four predetermined locations, a starting motor associated with the engine, and a pinion gear on the starting motor, the improvement comprising:

a flywheel comprising a generally flat disc having an aperture in the center thereof for mounting on the crankshaft of the engine;

said disc including a ring portion, integrally formed with and positioned around the outer circumference of said disc, said disc and integrally formed ring portion being a one piece construction of substantially the same thickness, said ring portion having radially outwardly extending teeth of the same shape thereon adapted to engage the starting motor pinion gear on the engine;

said flywheel also comprising four separate and distinct reinforcement members, each being generally in the shape of a portion of an annulus and extending over only radially outer portions of said flywheel and having radially outwardly extending teeth of the same shape thereon in overlapping and circumferentially aligned relationship with teeth on said ring portion to provide additional strength to said teeth on said ring portion, said overlapping teeth on said reinforcement members being of the same shape as said teeth on said ring portion;

one of said reinforcement members being positioned on said flywheel at each of said four predetermined locations where the deenergized engine comes to rest; and means for mounting said flywheel on the crankshaft of the engine so that the pinion gear will initially engage said flywheel at one of said four predetermined locations where said reinforcement members are positioned.

* * * * *

UNITED STATES PATENT AND TRADEMARK OFFICE
CERTIFICATE OF CORRECTION

PATENT NO. : 4,462,269
DATED : July 31, 1984
INVENTOR(S) : James J. Inglis

It is certified that error appears in the above-identified patent and that said Letters Patent is hereby corrected as shown below:

ON THE TITLE PAGE:

Under "U. S. Patent Documents" insert -- 3,148,144 9/1964 Brenner et al.--.

Column 5, line 64, "1.951" should read -- 10.951 --.

Signed and Sealed this

Seventh Day of May 1985

[SEAL]

Attest:

DONALD J. QUIGG

Attesting Officer

Acting Commissioner of Patents and Trademarks

UNITED STATES PATENT AND TRADEMARK OFFICE
CERTIFICATE OF CORRECTION

PATENT NO. : 4,462,269
DATED : July 31, 1984
INVENTOR(S) : James J. Inglis

It is certified that error appears in the above-identified patent and that said Letters Patent is hereby corrected as shown below:

ON THE TITLE PAGE:

Under "U. S. Patent Documents" insert --3,148,144 - 9/1964 - Brenner et al--.

Under "Foreign Patent Documents" insert:

--  256,254 Great Britain--;
    --  986,288 Great Britain--;
    --  989,898 Great Britain--;
    --1,005,563 Great Britain--;
    --2,043,208 Great Britain--.

Column 5, line 64, "1,951" should be -- 10,951--.

This certificate supersedes Certificate of Correction issued May 7, 1985.

Signed and Sealed this

Fifteenth Day of October 1985

[SEAL]

Attest:

DONALD J. QUIGG

Attesting Officer

Commissioner of Patents and Trademarks—Designate